United States Patent
Li et al.

(10) Patent No.: US 11,947,176 B1
(45) Date of Patent: Apr. 2, 2024

(54) OPTICAL FIBER SPLICING BOX

(71) Applicants: Huizhou Fibercan Industrial Co., Ltd, Huizhou (CN); OPTRONICS S.A. DE C.V., La Piedad (MX)

(72) Inventors: Yaole Li, Huizhou (CN); Paulo Pereira Marques, Lisbon (PT)

(73) Assignees: Huizhou Fibercan Industrial Co., Ltd, Huizhou (CN); OPTRONICS S.A. DE C.V., La Piedad (MX)

( * ) Notice: Subject to any disclaimer, the term of this patent is extended or adjusted under 35 U.S.C. 154(b) by 0 days.

(21) Appl. No.: 17/983,546

(22) Filed: Nov. 9, 2022

(30) Foreign Application Priority Data

Sep. 28, 2022 (CN) .......................... 202211187952.X

(51) Int. Cl.
*G02B 6/44* (2006.01)
*G02B 6/255* (2006.01)
*G02B 6/38* (2006.01)

(52) U.S. Cl.
CPC .......... *G02B 6/4446* (2013.01); *G02B 6/2553* (2013.01); *G02B 6/3802* (2013.01)

(58) Field of Classification Search
None
See application file for complete search history.

(56) References Cited

U.S. PATENT DOCUMENTS

| | | | | |
|---|---|---|---|---|
| 4,666,240 A * | 5/1987 | Caron | .................. | G02B 6/4454 174/93 |
| 4,754,876 A * | 7/1988 | Noon | ..................... | G02B 6/444 206/485 |
| 4,805,979 A * | 2/1989 | Bossard | ............... | G02B 6/4446 385/135 |
| 5,420,957 A * | 5/1995 | Burek | .................. | G02B 6/4446 385/135 |
| 5,450,518 A * | 9/1995 | Burek | .................. | G02B 6/4454 385/135 |
| 5,495,549 A * | 2/1996 | Schneider | ............ | G02B 6/4446 D13/152 |
| 5,862,290 A * | 1/1999 | Burek | .................. | G02B 6/3801 385/134 |
| 6,157,715 A * | 12/2000 | Daoud | .................. | H04Q 1/028 379/412 |
| 11,516,327 B2 * | 11/2022 | Allen | ...................... | H04M 1/04 |

(Continued)

*Primary Examiner* — Jerry Rahll
(74) *Attorney, Agent, or Firm* — Georgi Korobanov

(57) ABSTRACT

An outdoor optical fiber splicing box, a cable storage structure is fixed at the bottom of the inner cavity, a plurality of wiring structures are stacked on the upper side of the cable storage structure, and two sides of the wiring structure are provided with a multi-fiber supporting mechanism and a single-fiber supporting mechanism, which are fixed at the bottom of the inner cavity. The single-fiber and multi-fiber supporting mechanisms are all arranged on the side of the wiring structure. The box body is provided with a first and a second cable inlet/outlets, and the first cable inlet/outlet is provided with a single optical fiber waterproof structure. The second cable inlet/outlet is provided with a multi-fiber waterproof structure, and the waterproof effect is good. At the same time, the single-fiber and multi-fiber supporting mechanisms can protect the optical fiber cable from vibration, impact, cable stretching, and twisting.

8 Claims, 13 Drawing Sheets

(56) References Cited

U.S. PATENT DOCUMENTS

| | | | | |
|---|---|---|---|---|
| 2003/0091315 A1* | 5/2003 | Allerellie | ............ | G02B 6/4447 |
| | | | | 385/135 |
| 2006/0008230 A1* | 1/2006 | Giordano | ............ | G02B 6/4447 |
| | | | | 385/100 |
| 2006/0147173 A1* | 7/2006 | Womack | ............ | G02B 6/4452 |
| | | | | 385/135 |
| 2011/0299823 A1* | 12/2011 | Bran De Leon | ..... | G02B 6/4455 |
| | | | | 385/135 |
| 2017/0227728 A1* | 8/2017 | Claessens | ............ | G02B 6/4455 |
| 2022/0007089 A1* | 1/2022 | Claessens | ............ | H04Q 1/021 |

* cited by examiner

OPTICAL FIBER SPLICING BOX

CROSS-REFERENCE TO RELATED APPLICATIONS

This application claims the benefit and priority of Chinese patent application No. 202211187952.X, filed on Sep. 28, 2022, disclosure of which is hereby incorporated by reference in its entirety.

TECHNICAL FIELD

The present application relates to the field of cable connection, in particular to an optical fiber splicing box.

BACKGROUND

Optical fiber splicing box, which has the splicing part of the protective component, must be used in the construction of optical cable line engineering, and is one of the very important equipment. The quality of the optical fiber splicing box directly affects the quality and the service life of the optical cable line. Only a single fiber can be connected to the existing fiber splicing box. The single optical fiber connected must be a straight-through cable, and the length of the optical fiber cable must be calculated in advance. Because the excess part of the fiber optic cable that is too long cannot be stored, the fiber optic cable that is too short cannot reach the splicing tray area. If the fiber optic cable is a cut cable, it needs to be connected with a connector before it can enter the box. However, the existing splicing box cannot meet the needs of splicing the cut fiber optic cable. When multiple optical fibers need to be connected, the existing splicing box can only meet the needs of more optical fiber access by increasing the optical fiber inlet/outlet, and the number of spliced fibers in the wiring structure is limited, so the total number of connected optical fibers is limited. The structure of the existing splicing box is not stable enough, the waterproof effect is not good enough, and the cost of wiring and assembly man-hours is also high. Generally speaking, the existing splicing boxes cannot meet the diverse requirements, and the present application aims to solve the above problems.

In order to overcome the deficiencies of the prior art, the present application provides an optical fiber splicing box.

The technical solution adopted by this application to solve its technical problems is: An optical fiber splicing box, comprising a box body and a box cover, the box body and the box cover are buckled, and the box body is provided with a first opening facing upward, the box body is provided with an inner cavity, wherein a first waterproof ring is provided between the box body and the box cover, the inner cavity comprises a bottom, and a side wall of the box body is provided with a first cable inlet/outlet that allows a single fiber cable with a connector to enter the inner cavity, a second cable inlet/outlet for a plurality of straight-through cables to enter the inner cavity, and a cable storage structure is fixed at the bottom of the inner cavity, and a top of cable storage structure is fixed with a plurality of stacked wiring structures, a first cable positioning structure and a second cable positioning structure are arranged in the box body, a plurality of first cable inlet/outlets are provided and are respectively arranged on both sides of the cable storage structure, and a plurality of the second cable inlet/outlets are provided and are respectively arranged on both sides of the cable storage structure, the first cable positioning structure is arranged between the first cable inlet/outlet and the wiring structure, and the second cable positioning structure is arranged between the second cable inlet/outlet and the wiring structure, a first waterproof structure is arranged between the first cable inlet/outlet and the optical fiber cable, and a second waterproof structure is arranged between the second cable inlet/outlet and the optical fiber cable.

According to further technical solutions, the wiring structure comprises a fiber splicing trays and a thin cover that is clamped to the uppermost splicing tray, fiber splicing covers hinged with the fiber splicing trays, the thin cover is located on the upper side of the fiber splicing tray, and the fiber splicing cover covers the upper side of the thin cover; and the fiber splicing tray is fixedly connected to the top of the cable storage structure and linearly stacked in sequence, and the adjacent fiber splicing trays are hinged.

According to further technical solutions, the cable storage structure comprises a door frame-shaped bracket, a first fixed side plate and a second fixed side plate fixedly connected with the door frame-shaped bracket, the first fixed side plate and the second fixed side plate are fixed on the left and right sides of the door frame-shaped bracket, and form a "π" shape with the door frame-shaped bracket, the first fixed side plate and the second fixed side plate are both provided with first positioning holes, and the top of the door frame-shaped bracket is provided with second positioning holes.

According to further technical solutions, the box body comprises a left side wall, a right side wall, a front side wall and a rear side wall, wherein first upper openings of the left side wall and the right side wall are respectively provided with first flange structures extending toward the outside, the first flange structure is provided with a first half-through hole penetrating the left side wall or the right side wall, and the box cover is provided with a second flange structure extending toward the outside and corresponding to the first flange structure, the second flange structure is provided with a second half-through hole, and the first half-through hole and the second half-through hole are combined to form the first cable inlet/outlet.

According to further technical solutions, the first waterproof structure comprises a cylindrical cylinder, side wing portions fixedly connected with an end of the cylindrical cylinder, the center of the cylindrical cylinder is provided with a third through hole, an outer surface of the cylindrical cylinder is provided with a first groove, and the hollow cylindrical cylinder is provided with a second opening communicating with the third through hole, and the side wing portions are provided with two and are symmetrically arranged on both sides of the second opening, and the side wing portion comprises a main body part, a side surface of the main body part is provided with a first cantilever structure fixedly connected to the side surface, and a side surface of the first cantilever structure is provided with a first triangular protrusion protruding from the upper and lower surfaces of the first cantilever structure, a positioning portion is provided at the end of the main body portion away from the cylindrical cylinder, the positioning portion is configured to be a straight-line rectangular parallelepiped, and the middle portion of the positioning portion is provided with an arc-shaped protrusion.

According to further technical solutions, the first half-through hole and the second half-through hole are both provided with a positioning rib corresponding to the first groove, the left side wall, the right side wall, the front side wall, and the rear side wall are respectively provided with a first positioning groove, the sides of the left side wall, the right side wall, the front side wall, and the rear side wall facing the inner cavity are respectively provided with a first chamfer, wherein the first waterproof ring is provided with a first waterproof body, a second cantilever structure extending from the first waterproof body, a second triangular protrusion extending from the second cantilever structure, wherein the first waterproof ring is interrupted at the first cable inlet/outlet, and the first waterproof body is provided with a second positioning groove at the interruption, and the second positioning groove is provided with a third arc-shaped groove, and a lower half of the second triangular protrusion backs against the first chamfer.

According to further technical solutions, the first cable positioning structure comprises a single optical fiber support column fixed to the bottom of the inner cavity, a first fixing cover screwed with the single optical fiber support column, a first optical fiber fixing structure fixed with the cable storage structure, a top of the single optical fiber support column is provided with a second arc-shaped groove, the first fixing cover is in the shape of an arc in the middle, the first optical fiber fixing structure comprises a first square fixing body, a first fixing plate extending from the first square fixing body to the side, the first square fixing body and the first fixing plate form an L-shape, the first fixing plate is provided with a ninth through hole, the first square fixing body is provided with a fourth through hole on the side facing the single fiber support column, a fourth threaded hole communicated with the fourth through hole is provided on the top of the first square fixing body, a first screw is provided in the fourth threaded hole.

According to further technical solutions, the box body is provided with convex cylinders, the center of the convex cylinder is provided with a second cable inlet/outlet communicating with the inner cavity, a first external thread is provided on the outer side of the convex cylinder, the convex cylinders are arranged on both sides of the first cable inlet/outlet, the second waterproof structure comprises a claw partially defined in the second cable inlet/outlet, a second waterproof ring defined between the claw and the second cable inlet/outlet, a first rubber column defined in the claws, a tightening ring threadedly connected with the first external thread, the first rubber column is provided with a plurality of fifth through holes for the optical fiber cables to pass through.

According to further technical solutions, the bottom of the inner cavity is provided with a convex platform, the convex platform is provided with a plurality of fifth threaded holes, the box body is provided with a bottom surface exposed to the outside, the bottom surface of the box body is provided with a first concave platform and second concave platforms, the second concave platforms are provided with two and are arranged on both sides of the first concave platform, the depth of the convex platform is greater than the depth of the concave platform, the bottom of the first concave platform is provided with a plurality of protruding columns and hanging platforms, the height of the protruding column is lower than the depth of the first concave platform, n the protruding column is provided with an eighth inner threaded hole.

The beneficial effect of the present application is to provide an optical fiber splicing box, which allows the optical fiber cable to enter the inner cavity from the optical fiber inlet. If it is a single fiber optic cable, it enters the inner cavity from the first cable inlet/outlet, and is supported and fixed by the first cable positioning structure. The excess single fiber optic cable is wound into the cable storage structure and then enters the wiring structure, and after splicing, it extends from the first cable inlet/outlet through the first cable positioning structure. Even if the single fiber optic cable is a cut cable and thus needs to be connected with a connector, the single fiber optic cable together with the connector can be smoothly put into the first cable inlet/outlet. Under the pressure of the box cover, the first waterproof structure can also achieve a waterproof effect. If there are multiple optical fiber cables, they enter the inner cavity from the second cable inlet/outlet, and are supported and fixed by the second cable positioning structure. The excess single fiber optic cable is wound into the cable storage structure and then enters the wiring structure, and then goes out from the second cable inlet/outlet through the second cable positioning structure after being spliced by the wiring structure. Both the optical fiber inlet and the optical fiber outlet are provided with a first waterproof structure and a second waterproof structure to ensure that the optical fiber inlet and the optical fiber outlet can be effectively waterproofed. The box body and the box cover can endure harsh environmental changes, and the first waterproof ring plays a waterproof role. By arranging the box body, the box cover, the first waterproof ring, the first waterproof structure and the second waterproof structure, the aging corrosion effect on the internal structure of the box body caused by water, heat, cold, light, oxygen and microorganisms in nature can be prevented. At the same time, the first cable positioning structure and the second cable positioning structure protect the optical fiber cable from vibration, impact, stretching and twisting of the optical fiber cable.

The structure of the present application is simple, can be applied to a single optical fiber, multiple optical fibers, and can be applied to a single optical fiber that is cut and has a connector.

DETAILED DESCRIPTION

The embodiments of the present application will be described below with reference to the accompanying drawings and related embodiments, but the embodiments of the present application are not limited to the following embodiments. This application relates to relevant necessary components in the technical field, and should be regarded as well-known technology in the technical field, which can be known and mastered by those skilled in the technical field.

Figure 1:
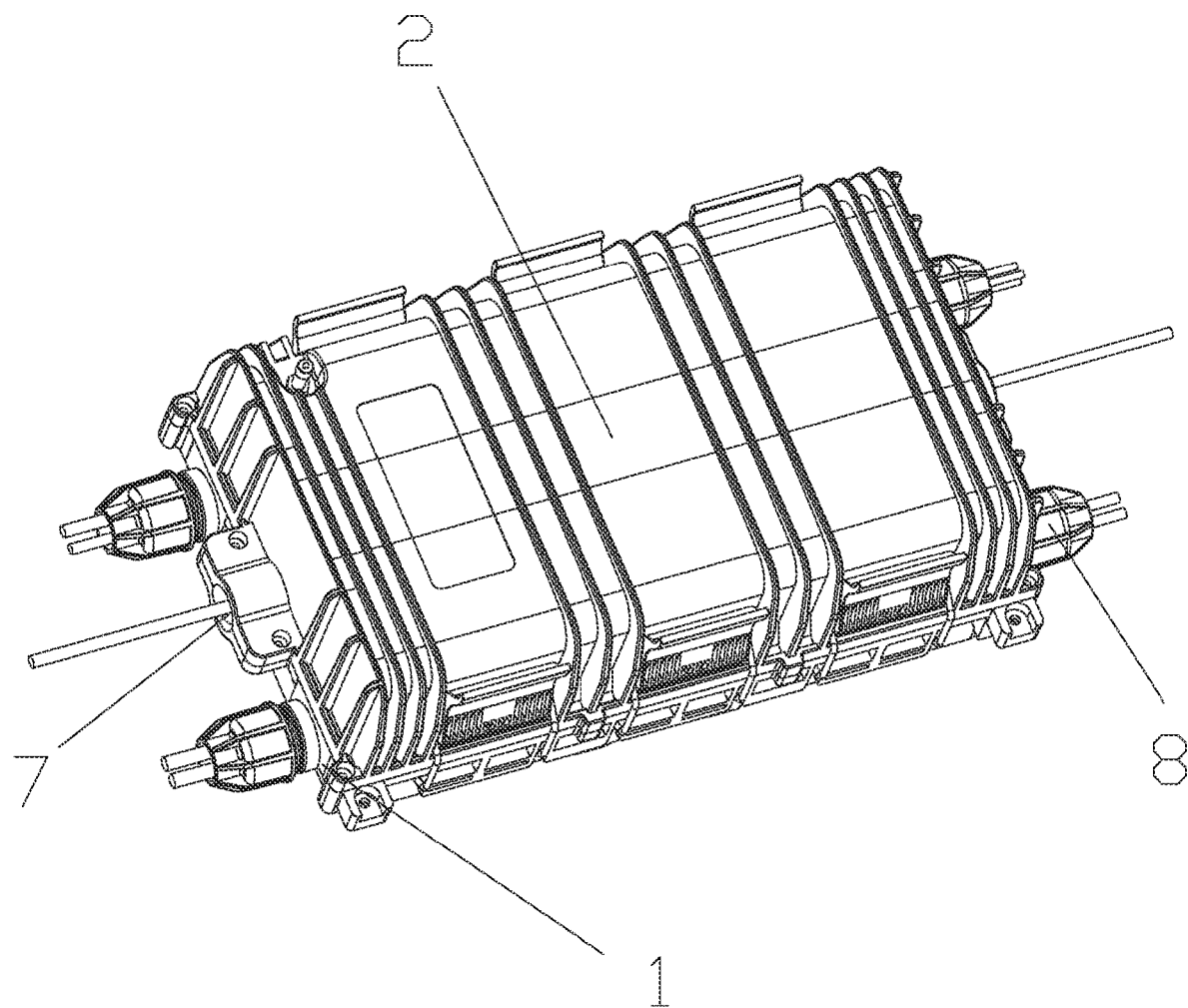
FIG. 1 is a schematic structural diagram of an outdoor optical fiber splicing box according to the present application.
Figure 2:
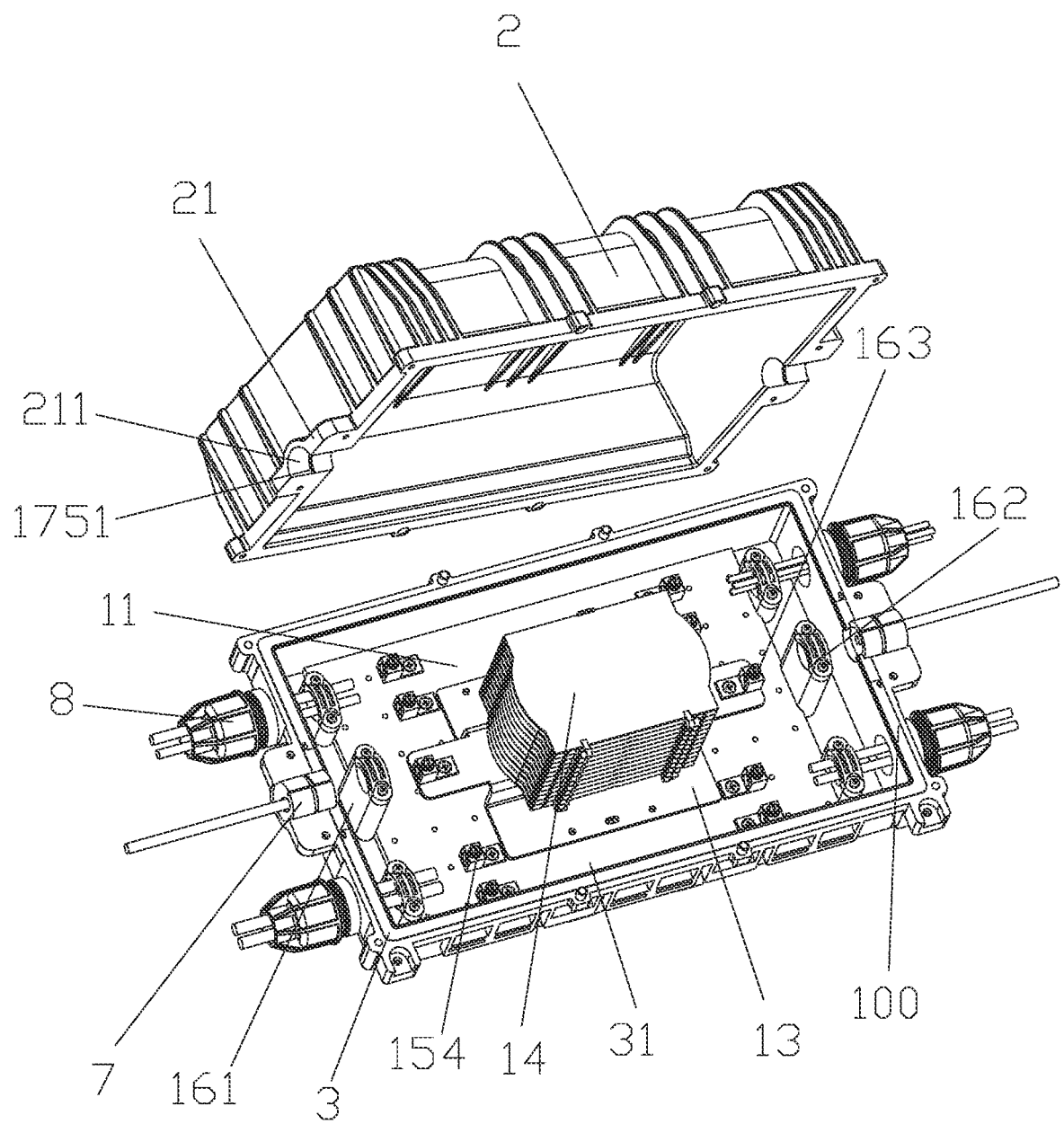
FIG. 2 is an exploded schematic structural diagram of an outdoor optical fiber splicing box according to the present application.
Figure 3:
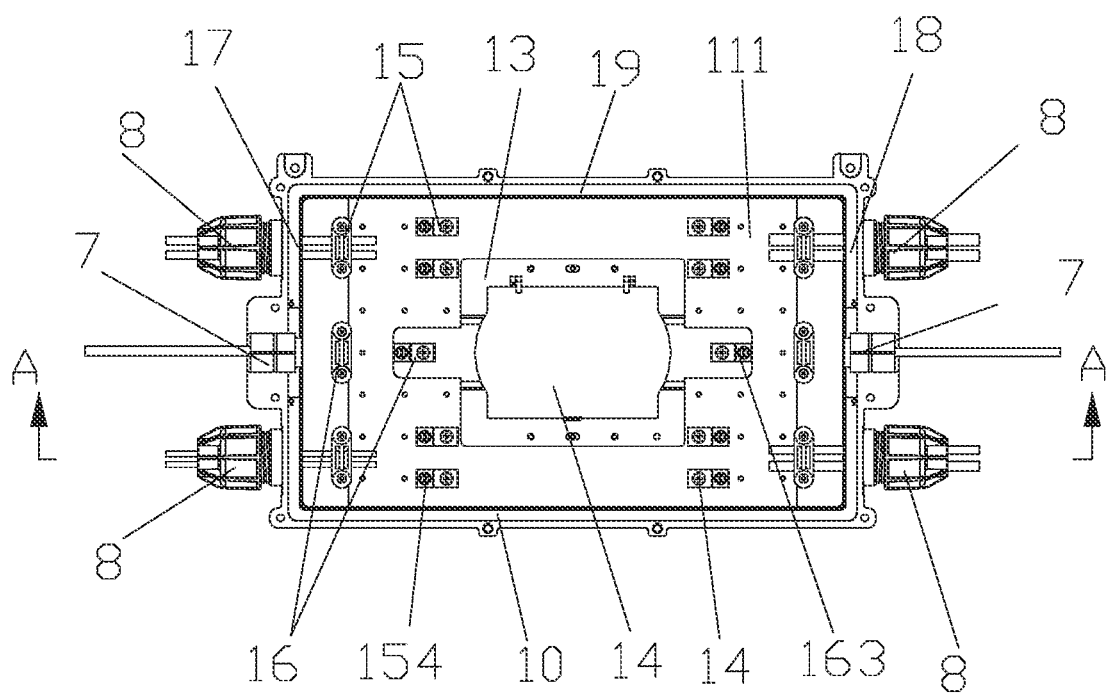
FIG. 3 is a schematic structural diagram of a top view of a partial structure of an outdoor optical fiber splicing box according to the present application.
Figure 4:
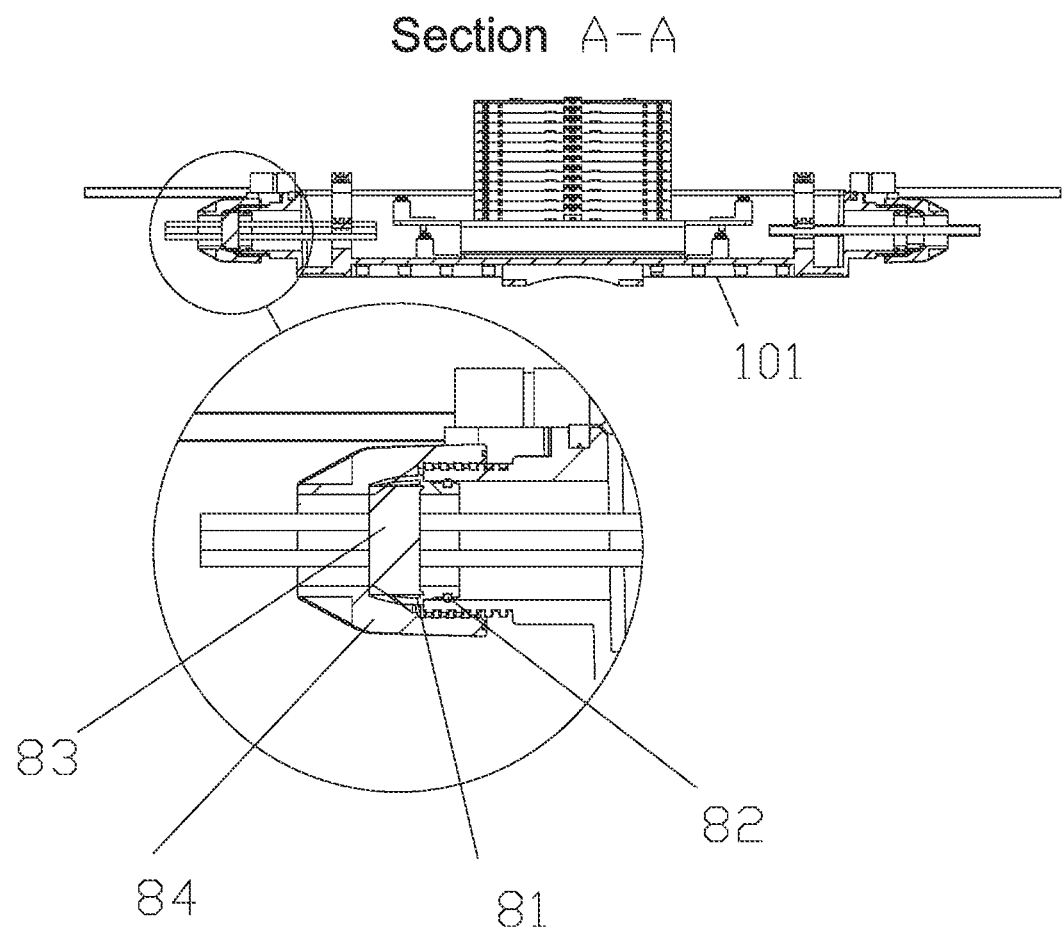
FIG. 4 is a schematic cross-sectional view of FIG. 4 of the outdoor optical fiber splicing box according to the present application.
Figure 5:
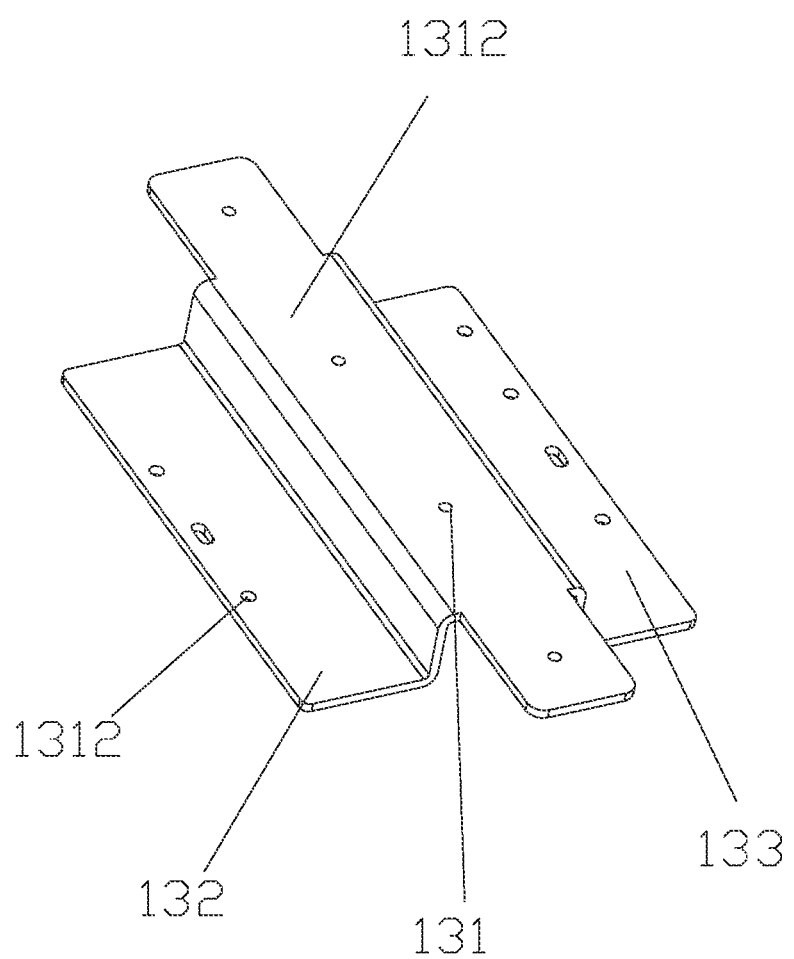
FIG. 5 is a partial structural schematic diagram of the cable storage structure of the outdoor optical fiber splicing box according to the present application.
Figure 6:
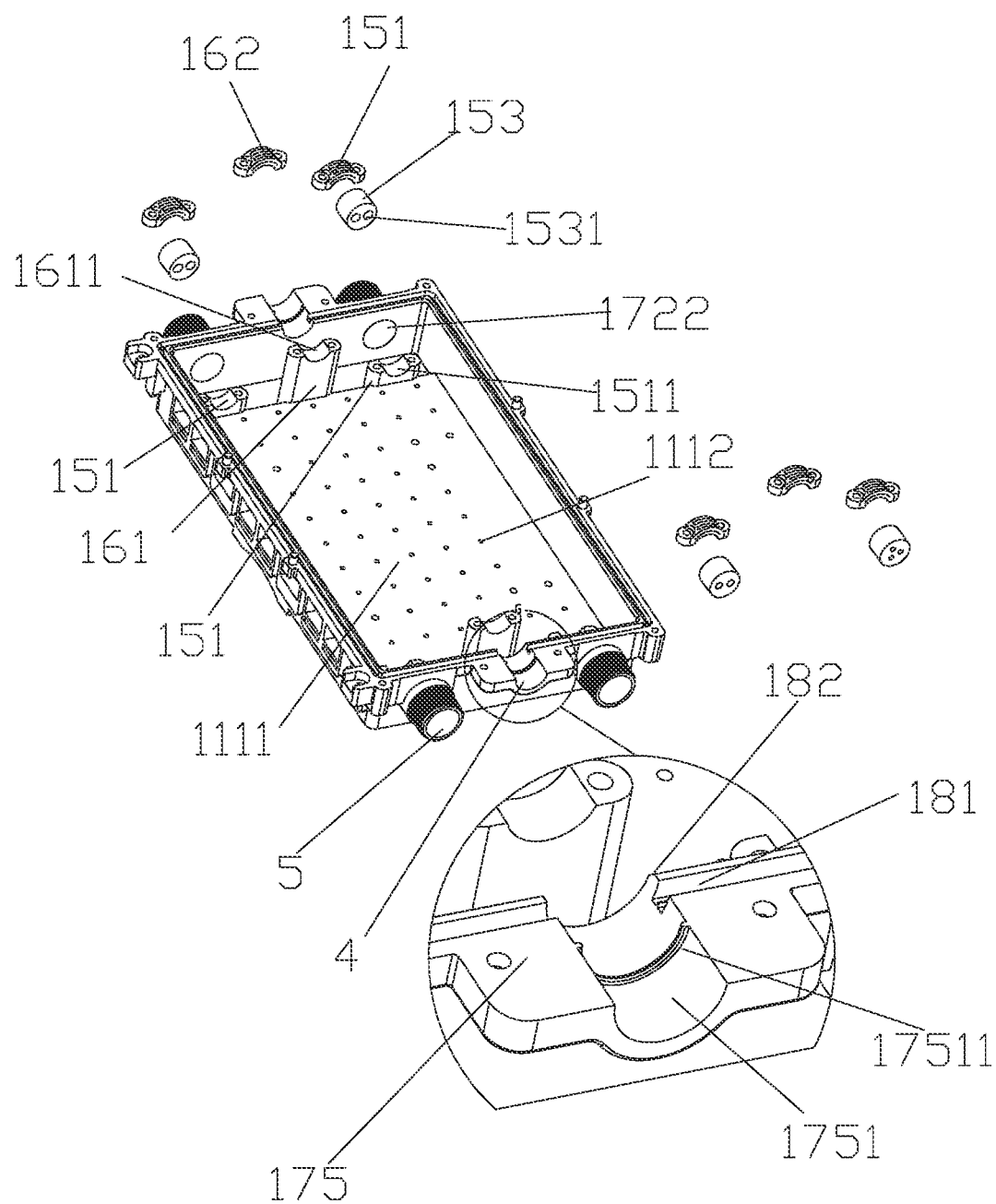
FIG. 6 is a schematic partial structural diagram of the box body of the outdoor optical fiber splicing box according to the present application.
Figure 7:
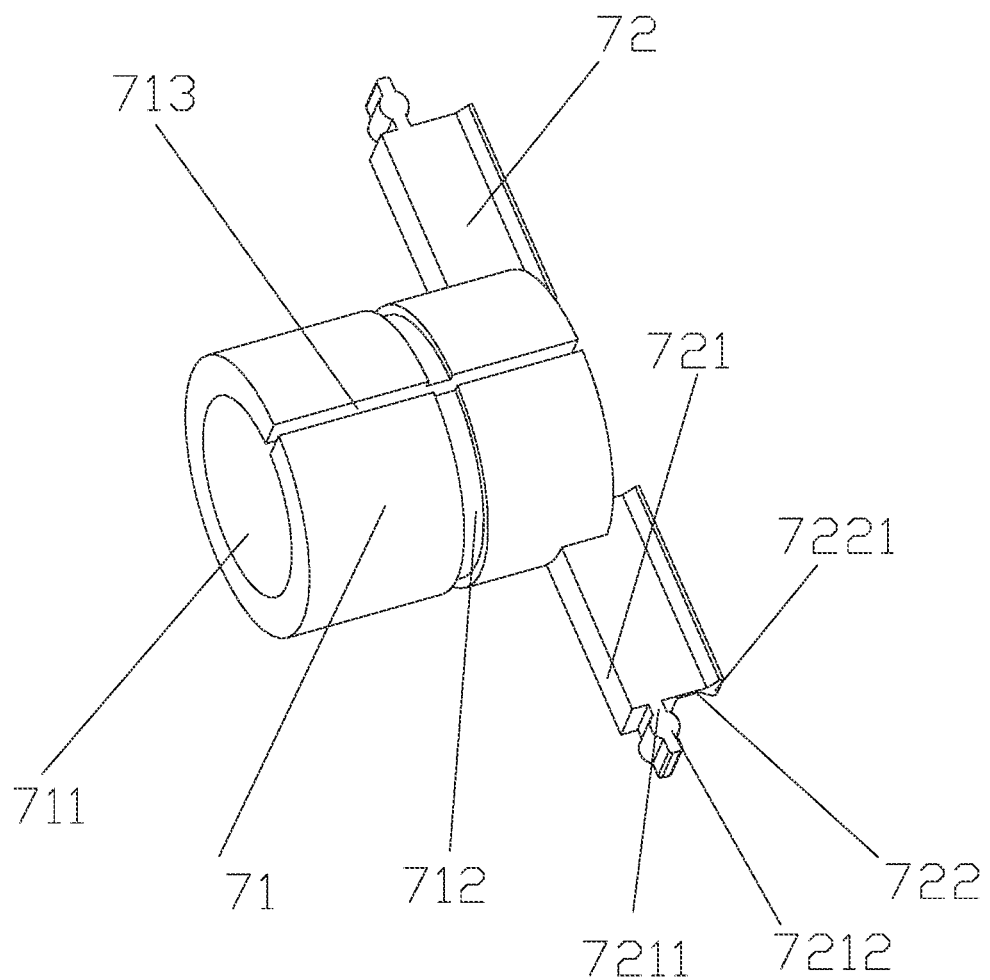
FIG. 7 is a schematic structural diagram of a first optical fiber waterproof structure of an outdoor optical fiber splicing box according to the present application.
Figure 8:
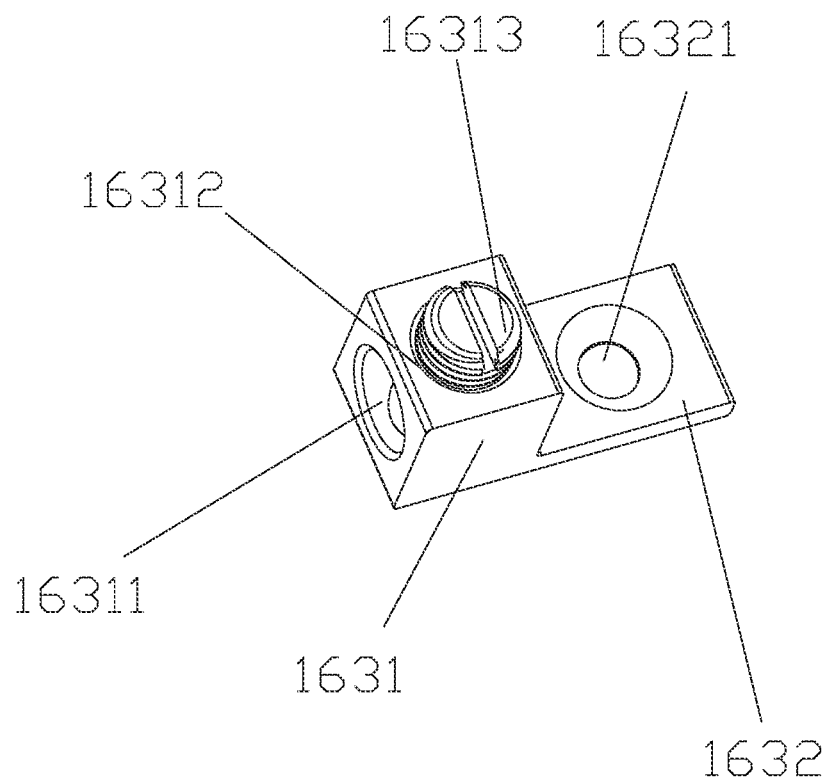
FIG. 8 is a schematic partial structural diagram of the first optical fiber supporting mechanism of the outdoor optical fiber splicing box according to the present application.
Figure 9:
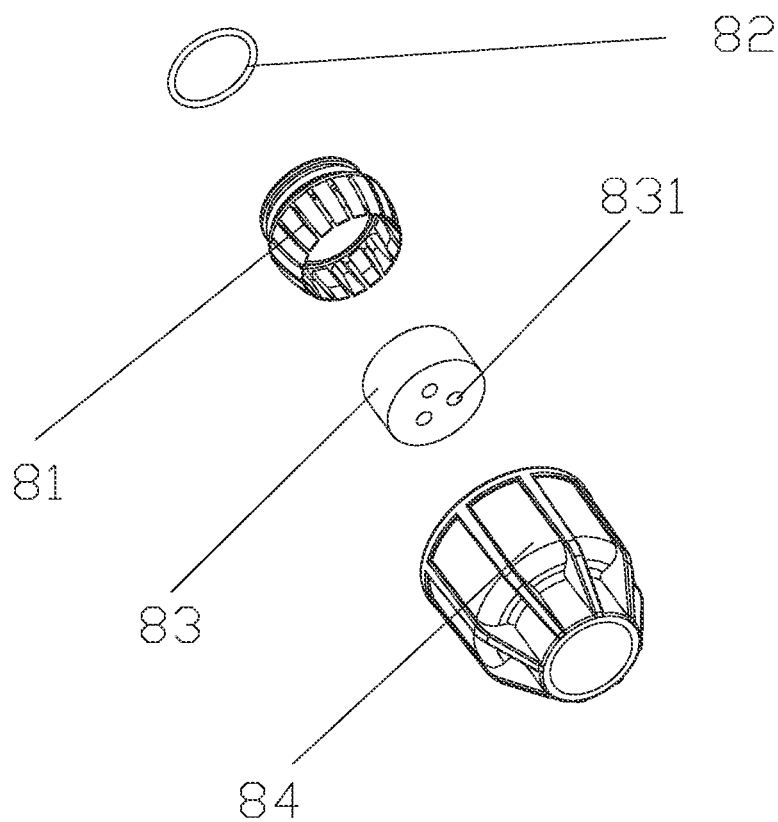
FIG. 9 is a schematic structural diagram of the second optical fiber waterproof structure of the outdoor optical fiber splicing box according to the present application.
Figure 10:
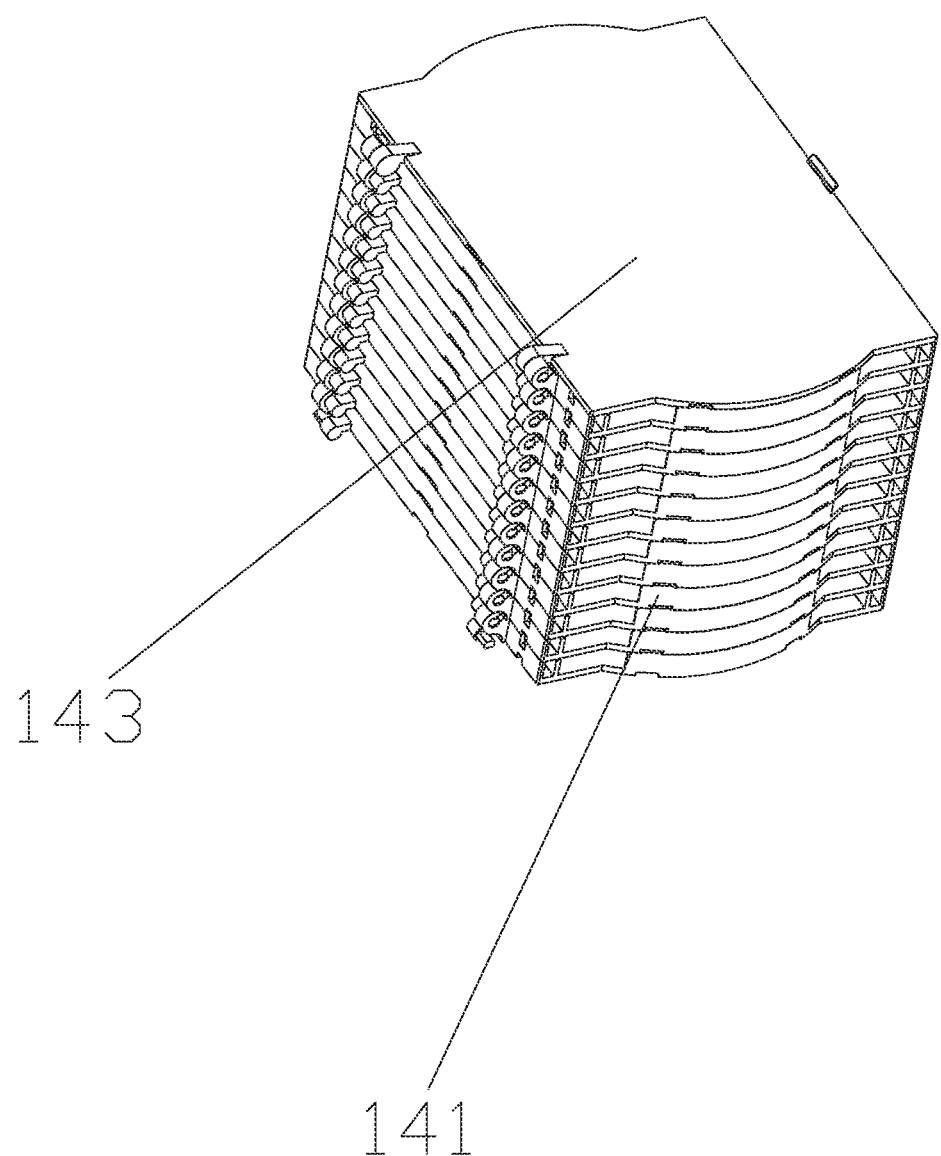
FIG. 10 is a schematic structural diagram of the wiring structure of the outdoor optical fiber splicing box according to the present application.
Figure 11:
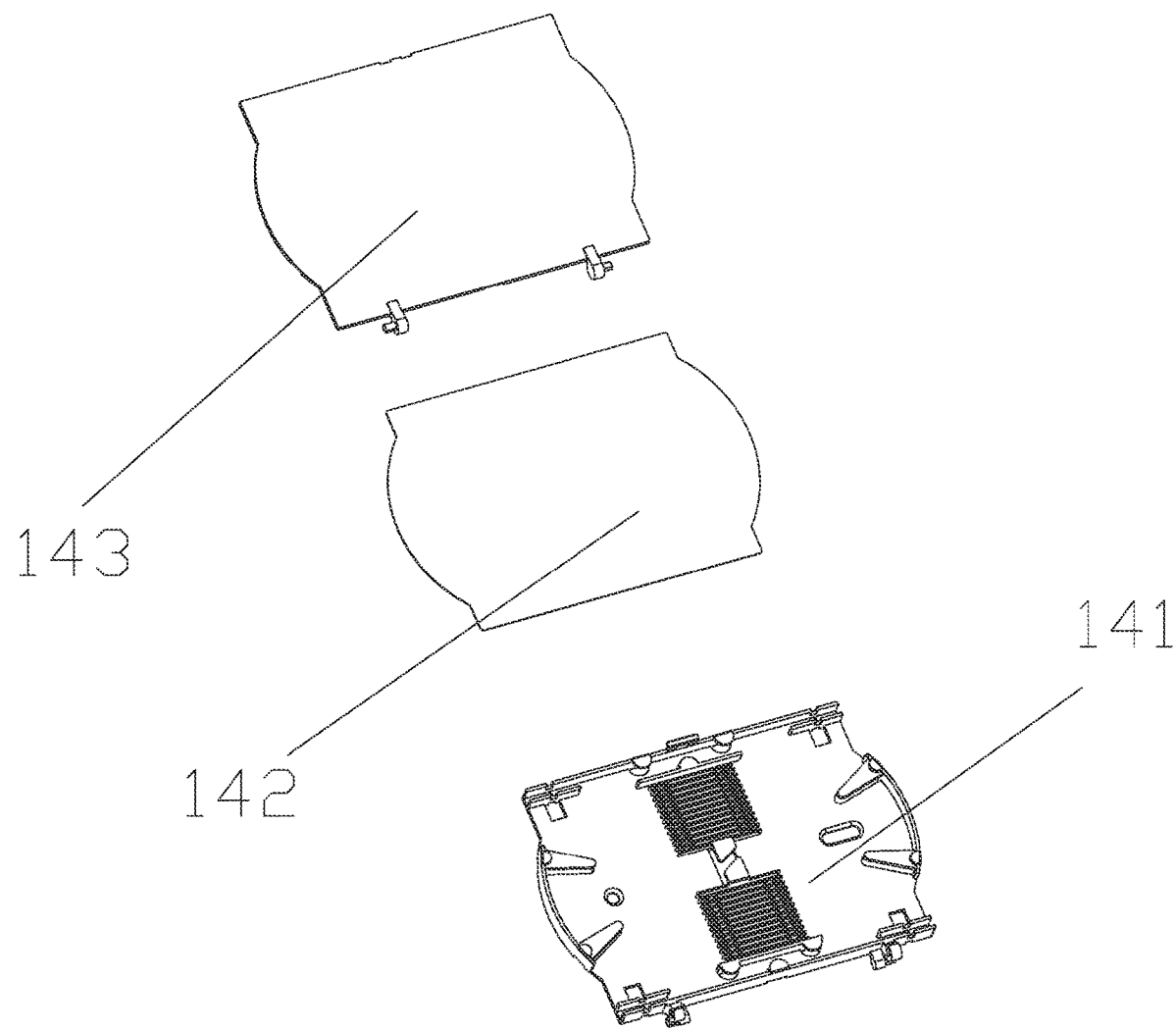
FIG. 11 is an exploded schematic structural diagram of the wiring structure of the outdoor optical fiber splicing box according to the present application.
Figure 12:
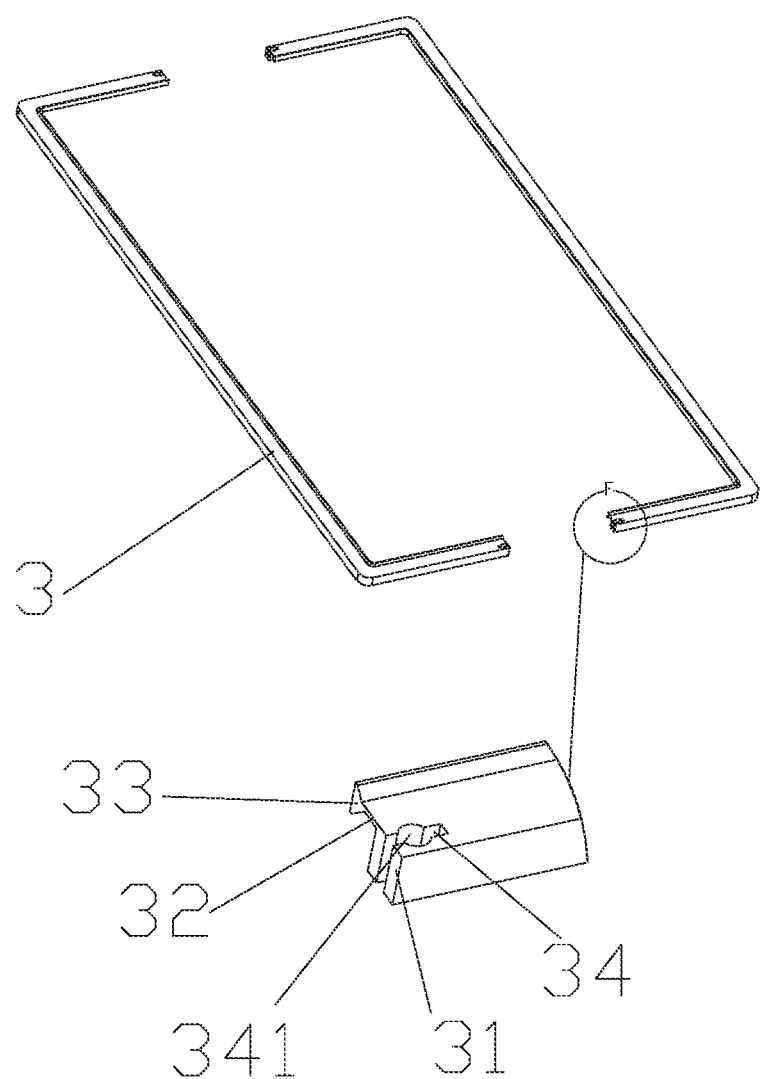
FIG. 12 is a schematic structural diagram of a first waterproof ring of an outdoor optical fiber splicing box according to the present application.
Figure 13:
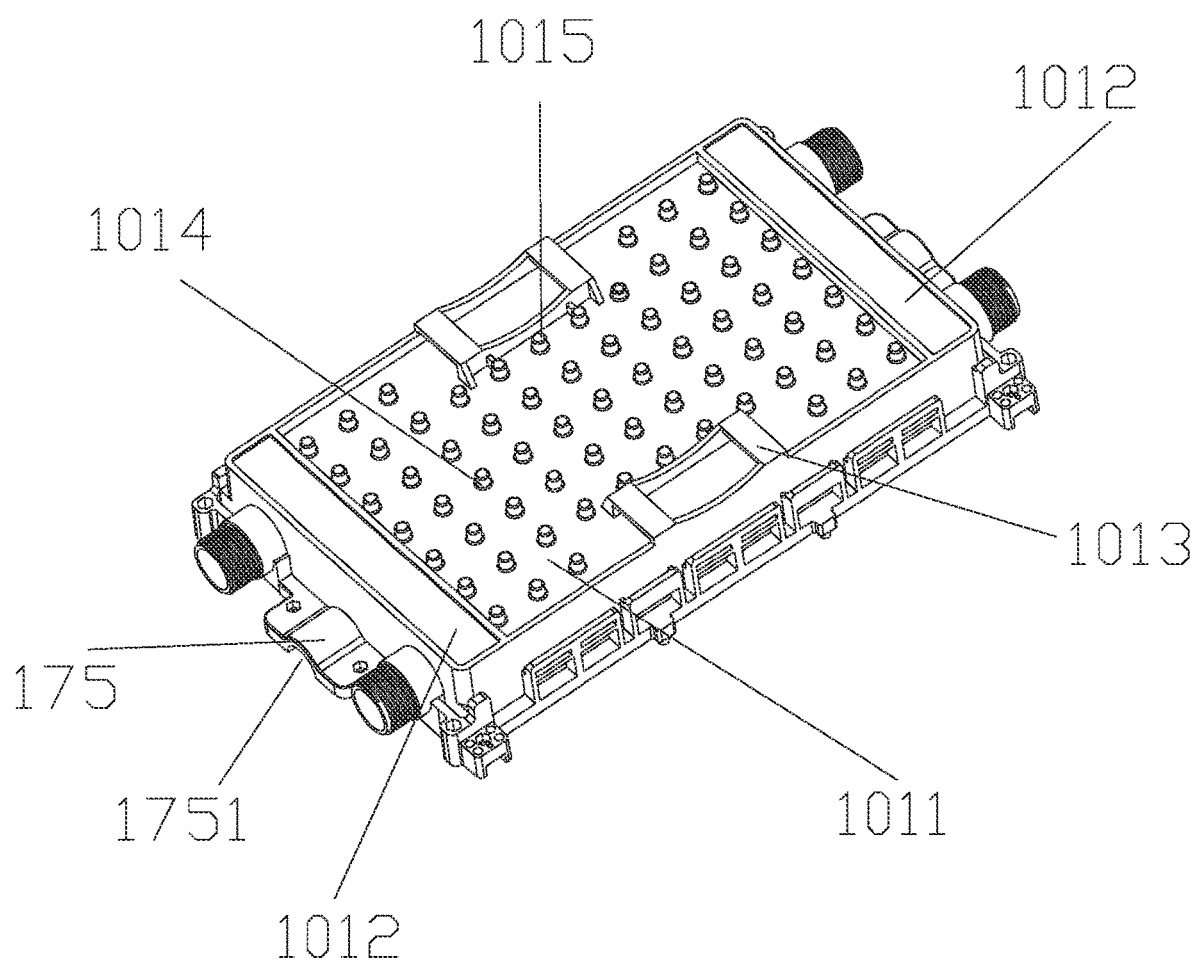
FIG. 13 is a schematic structural diagram of the box body of the outdoor optical fiber splicing box according to the present application in another direction.

Referring to FIG. 1 to FIG. 13, the present application is achieved as follows: An optical fiber splicing box, comprising a box body 1 and a box cover 2, the box body 1 and the box cover 2 are buckled, the box body 1 is provided with an inner cavity 11 and the box body 1 is provided with a first opening 100 facing upward. the box body 1 comprises a left side wall 17, a right side wall 18, a front side wall 19 and a rear side wall 10. The box body 1 is provided with an inner cavity 11, wherein a first waterproof ring 3 is provided between the box body 1 and the box cover 2. A side wall of the box body 1 is provided with a first cable inlet/outlet 4 that allows a single fiber cable with a connector to enter the inner cavity 11, a second cable inlet/outlet 5 for a plurality of straight-through cables to enter the inner cavity 11. A cable storage structure 13 is fixed at the bottom 111 of the inner cavity 11, and a top of cable storage structure 13 is fixed with a plurality of stacked wiring structures 14, a first cable positioning structure 16 and a second cable positioning structure 15 are arranged in the box body 1, the first cable inlet/outlets 4 are provided with two and are respectively arranged on both sides of the cable storage structure 13, and the second cable inlet/outlets 5 are provided with four and are respectively arranged on both sides of the cable storage structure 13, the first cable positioning structure 16 is arranged between the first cable inlet/outlet 4 and the wiring structure 14, and the second cable positioning structure 15 is arranged between the second cable inlet/outlet 5 and the wiring structure 14, a first waterproof structure 7 is arranged between the first cable inlet/outlet 4 and the optical fiber cable, and a second waterproof structure 8 is arranged between the second cable inlet/outlet 5 and the optical fiber cable.

In this embodiment, according to the actual application situation on site, the optical fiber cable enters the inner cavity 11 from the first cable inlet/outlet 4. If a single optical fiber cable is supported and fixed by the first cable positioning structure 16, the excess single optical fiber cable 001 is wound into the cable storage structure 13 and then enters the wiring structure 14. After splicing by the wiring structure 14, it is then fixed and supported by the first cable positioning structure 16 to extend from the other first cable inlet/outlet 4. The first cable inlet/outlet 4 is provided with a first waterproof structure 7 to ensure that the first cable inlet/outlet 4 can be effectively waterproofed.

It is worth mentioning that, even if the single fiber optic cable is a cut cable and thus needs to be connected with a connector, the single fiber optic cable 001 together with the connector can be smoothly put into the first cable inlet/outlet 4. Under the pressure of the box cover 2, the first waterproof structure can also achieve a waterproof effect.

If there are multiple optical fiber cables, they enter the inner cavity 11 from the second cable inlet/outlet 5 at one side of the cable storage structure 13, and are supported and fixed by the second cable positioning structure 15. The excess single fiber optic cable is wound into the cable storage structure 13 and then enters the wiring structure 14, and then goes out from the second cable inlet/outlet 5 at other side of the cable storage structure 13 through the second cable positioning structure 15 after being spliced by the wiring structure 14. The second cable inlet/outlet 5 is provided with a second waterproof structure 8 to ensure that the second cable inlet/outlet 5 can be effectively waterproof.

The first wire cable inlet/outlet 4 and the second cable inlet/outlet 5 are arranged separately, so that different optical fiber cable inlets can be selected according to the actual situation when it is convenient for on-site application. When the optical fiber has a connector, the first cable inlet/outlet 4 must be selected.

The box body 1 and the box cover 2 can endure harsh environmental changes, and the first waterproof ring 3 plays a waterproof role. By arranging the box body 1, the box cover 2, the first waterproof ring 3, the first waterproof structure 7 and the second waterproof structure 8, the aging corrosion effect on the internal structure of the box body 1 caused by water, heat, cold, light, oxygen and microorganisms in nature can be prevented. At the same time, the first cable positioning structure 16 and the second cable positioning structure 15 protect the optical fiber cable from vibration, impact, stretching and twisting of the optical fiber cable.

On the basis of the above-mentioned embodiment, as a further preference, the wiring structure 14 comprises a fiber splicing trays 141 and a thin cover 142 that is clamped to the uppermost splicing tray 141, fiber splicing covers 143 hinged with the fiber splicing trays 141, the thin cover 142 is located on the upper side of the fiber splicing tray 141, and the fiber splicing cover 143 covers the upper side of the thin cover 142, and the fiber splicing tray 141 is fixedly connected to the top of the cable storage structure 13 and linearly stacked in sequence, and the adjacent fiber splicing trays 141 are hinged.

The hinges between the adjacent fiber splicing trays 141 can realize linear stacking, and the stacking function can be realized without the assistance of other components. The added splicing tray 141 increases the splicing function of the wiring structure 14. At the same time, the fiber splicing tray 141 located above can confine the optical fibers in the lower splicing tray 141 to their proper positions. The uppermost splicing tray 141 has no fiber splicing tray 141 on its upper side to define the optical fiber cable. Therefore, a thin cover 142 is clamped to the uppermost splicing tray 141 to define the optical fiber cable. The thin cover 142 is transparent, and the condition of the optical fibers in the splicing tray 141 can be easily observed through the thin cover 142. Since the thin cover 142 itself is thin and its strength is insufficient, the fiber splicing cover 143 is covered on the thin cover 142 to protect the fiber splicing tray 141 and the thin cover 142.

On the basis of the above-mentioned embodiment, as a further preference, the cable storage structure 13 comprises a door frame-shaped bracket 131, a first fixed side plate 132 and a second fixed side plate 133 fixedly connected with the door frame-shaped bracket 131, the first fixed side plate 132 and the second fixed side plate 133 are fixed on the left and right sides of the door frame-shaped bracket 131, and form a "π" shape with the door frame-shaped bracket 131, the first fixed side plate 132 and the second fixed side plate 133 are both provided with first positioning holes 1321, and the top of the door frame-shaped bracket 131 is provided with second positioning holes 1312.

Screws pass through the first positioning holes 1321 to fixedly connect the first fixed side plate 132 and the second fixed side plate 133 to the bottom 111 of the inner cavity 11, thereby fixing the entire wire storage structure 13 to the bottom 111 of the inner cavity 11. Screws pass through the second positioning holes 1312 to fix the fiber splicing tray 141 and the door frame-shaped bracket 131, and the inner side of the door frame-shaped bracket forms an open space for storing excess optical fiber cables.

On the basis of the above-mentioned embodiment, as a further preference, first upper openings 100 of the left side wall 17 and the right side wall 18 are respectively provided with first flange structures 175 extending toward the outside, the first flange structure 175 is provided with a first half-through hole 1751 penetrating the left side wall 17 or the right side wall 18, the first half-through hole 1751 communicates with the inner cavity 11. The box cover 2 is provided with a second flange structure 21 extending toward the outside and corresponding to the first flange structure 175, the second flange structure 21 is provided with a second half-through hole 211, and the first half-through hole 1751 and the second half-through hole 211 are combined to form the first cable inlet/outlet 4.

The first cable inlet/outlet 4 is formed by the combination of the first half-through hole 1751 and the second half-through hole 211. Open the box cover 2, put the optical fiber cable into the first half-through hole 1751, and fixes the single optical fiber cable by the first cable positioning structure 16, and then covers the box cover 2, which is simple and convenient. Through the first flange structure 175 and the second flange structure 21, the length of the first cable inlet/outlet 4 is lengthened, and the strength of the first cable inlet/outlet 4 is strengthened.

On the basis of the above-mentioned embodiment, as a further preference, the first waterproof structure 7 comprises a cylindrical cylinder 71, side wing portions 72 fixedly connected with an end of the cylindrical cylinder 71, the center of the cylindrical cylinder 71 is provided with a third through hole 711, an outer surface of the cylindrical cylinder 71 is provided with a first groove 712, and the hollow cylindrical cylinder 71 is provided with a second opening 713 communicating with the third through hole 711, and the side wing portions 72 are provided with two and are symmetrically arranged on both sides of the second opening 713, and the side wing portion 72 comprises a main body part 721, a side surface of the main body part 721 is provided with a first cantilever structure 722 fixedly connected to the side surface, and a side surface of the first cantilever structure 722 is provided with a first triangular protrusion 7221 protruding from the upper and lower surfaces of the first cantilever structure 722, a positioning portion 7211 is provided at the end of the main body portion 721 away from the cylindrical cylinder 71, the positioning portion 7211 is configured to be a straight-line rectangular parallelepiped, and the middle portion of the positioning portion 7211 is provided with an arc-shaped protrusion 7212.

The cylindrical cylinder 71 is placed in the half-through hole 1751. When a single optical fiber needs to be installed, the second opening 713 is opened to place the single optical fiber in the third through hole 711. The side wing portion 72 is defined in the left side wall 17 or the right side wall 18, and the arc-shaped protrusion 7212 makes the side wing portion 72 more stably defined in the left side wall 17 or the right side wall 18. The cylindrical cylinder 71 and the side wing portions 72 are made of rubber with strong elasticity. The optical fiber is limited in the third through hole 711, and after the box cover 2 is fastened, a gapless pressing is formed between the cylindrical cylinder 71 and the first cable inlet/outlet 4 to achieve the waterproof effect. The side wing portions 72 are defined in the left side wall 17 or the right side wall 18, and are flush with the first waterproof ring 3, and work together with the first waterproof ring 3 to play a waterproof role.

On the basis of the above-mentioned embodiment, as a further preference, the first half-through hole 1751 and the second half-through hole 211 are both provided with a positioning rib 17511 corresponding to the first groove 712, the left side wall 17, the right side wall 18, the front side wall 19, and the rear side wall 10 are respectively provided with a first positioning groove 181, the sides of the left side wall 17, the right side wall 18, the front side wall 19, and the rear side wall 10 facing the inner cavity 11 are respectively provided with a first chamfer 182, wherein the first waterproof ring 3 is provided with a first waterproof body 31, a second cantilever structure 32 extending from the first waterproof body 31, a second triangular protrusion 33 extending from the second cantilever structure 32, wherein the first waterproof ring 3 is interrupted at the first cable inlet/outlet 4, and the first waterproof body 31 is provided with a second positioning groove 34 at the interruption, and the second positioning groove 34 is provided with a third arc-shaped groove 341, and a lower half of the second triangular protrusion 33 backs against the first chamfer 182.

When a single optical fiber needs to be installed, the cylindrical cylinder 71 is placed in the first half-through hole 1751, and the positioning rib 17511 of the half-through hole 1751 is located in the first groove 712. The main body portion 721 and the first waterproof body 31 are located in the first positioning groove 181. The second cantilever structure 32 covers the left side wall 17, the right side wall 18, the front side wall 19 and the rear side wall 10, and the first cantilever structure 722 covers the left side wall 17 and the right side wall 18. The straight-line rectangular parallelepiped is located in the second positioning groove 34, the arc-shaped protrusion 7212 is located in the third arc-shaped groove 341. The lower half of the first triangular protrusion 7221 and the second triangular protrusion 33 are backed against the first chamfer 182, so that the first waterproof ring 3 and the side wing portion 72 are more stably positioned inside the left side wall 17 or the right side wall 18. The upper half of the first triangular protrusion 7221 and the second triangular protrusion 33 form a protective wall, so that the purpose of waterproof and dustproof can be better achieved.

Open the second opening 713, place the single fiber in the third through hole 711 through the second opening 713, and then put the cover 2 on the box, and the positioning rib 17511 on the second half through hole 211 is positioned in the first groove 712, the single fiber optic cable is positioned in the third through hole 711, and the cylindrical cylinder 71 is positioned in the first cable inlet/outlet 4 or outlet. After the box cover 2 and the box body 1 are fastened together, the box cover 2 is attached to the upper sides of the first cantilever structure 722 and the second cantilever structure 32 and squeezes the cylindrical cylinder 71, so that there is no gap between the optical fiber and the cylindrical cylinder 71. At the same time, there is no gap between the cylindrical cylinder 71 and the first cable inlet/outlet 4, which can not only fix the single optical fiber cable, but also achieve the purpose of waterproofing. At the same time, this method provides a certain elastic space for the outer diameter of the single fiber cable. Even if the single fiber optic cable is a cut cable and thus needs to be connected with a connector, the single fiber optic cable 001 together with the connector can be smoothly put into the third through hole 711, and under the pressure of the box cover 2, the first waterproof structure 7 can also achieve the waterproof effect.

On the basis of the above-mentioned embodiment, as a further preference, the first cable positioning structure 16 comprises a single optical fiber support column 161 fixed to the bottom 111 of the inner cavity 11, a first fixing cover 162 screwed with the single optical fiber support column 161, a first optical fiber fixing structure 163 fixed with the cable storage structure 13, a top of the single optical fiber support column 161 is provided with a second arc-shaped groove 1611, the first fixing cover 162 is in the shape of an arc in the middle, the first optical fiber fixing structure 163 comprises a first square fixing body 1631, a first fixing plate 1632 extending from the first square fixing body 1631 to the side, the first square fixing body 1631 and the first fixing plate 1632 form an L-shape, the first fixing plate 1632 is provided with a ninth through hole 16321, the first square fixing body 1631 is provided with a fourth through hole 16311 on the side facing the single fiber support column 161, a fourth threaded hole 16312 communicated with the fourth through hole 16311 is provided on the top of the first square fixing body 1631, a first screw 16313 is provided in the fourth threaded hole 16312.

The first fixing cover 162 is an arc in the middle, so that a space is formed between the second arc-shaped groove 1611 and the first fixing cover 162 for accommodating a single optical fiber cable. Tighten the screws to fix the first fixing cover 162 and the single fiber support column 161, and squeeze and fix the single-fiber cable, and the remaining part of the single-fiber cable passes through the ninth through hole 16321. Tighten the first screw 16313, and position the single optical fiber cable firmly in the ninth through hole 16321, so that the single optical fiber cable can be protected from vibration, impact, cable stretching, and twisting. The remaining part of the single optical fiber cable is put into the inner side of the door frame-shaped bracket 131 of the cable storage structure 13 to keep the inner cavity 11 neat.

On the basis of the above-mentioned embodiment, as a further preference, the left side wall 17 and the right side wall 18 are provided with convex cylinders 183, the center of the convex cylinder 183 is provided with a second cable inlet/outlet 5 communicating with the inner cavity 11, a first external thread 1831 is provided on the outer side of the convex cylinder 183, the convex cylinders 183 are arranged on both sides of the first cable inlet/outlet 4, the second waterproof structure 8 comprises a claw 81 partially defined in the second cable inlet/outlet 5, a second waterproof ring 82 defined between the claw 81 and the second cable inlet/outlet 5, a first rubber column 83 defined in the claws 81, a tightening ring 84 threadedly connected with the first external thread 1831, the first rubber column 83 is provided with a plurality of fifth through holes 831 for the optical fiber cables to pass through, wherein the first rubber column 83 is in an interference fit with the claw 81.

The second waterproof ring 82 is positioned between the claws 81 and the second cable inlet/outlet 5, so that there is no gap between the claws 81 and the second cable inlet/outlet 5 to achieve waterproof effect, and at the same time, the claws 81 are squeezed and fixed on the Inside the second cable inlet/outlet 5. When multiple optical fiber cables need to be connected, loosen the tightening ring 84, insert these optical fiber cables into the fifth through holes 831, and then tighten the tightening ring 84 to tighten the claw 81, and then the claw 81 squeezes and tightens the rubber column, so that there is no gap between the optical fiber cable and the first rubber column 83 to achieve the purpose of waterproofing, and at the same time, the stability of the optical fiber cable is also ensured.

On the basis of the above-mentioned embodiment, as a further preference, the second cable positioning structure 15 comprises a multi-fiber support column 151 fixed to the bottom 111 of the inner cavity 11, a second fixing cover 152 screwed with to the multi-fiber support column 151, and a second rubber column 153 defined between the multi-fiber support column 151 and the second fixed cover 152, and a second optical fiber fixing structure 154 fixed with the bottom 111 of the inner cavity 11. The second rubber column 153 is provided with a plurality of eighth through holes 1531 for the optical fiber cables to pass through. The top of the multi-fiber support column 151 is provided with a third arc-shaped groove 1511, the second fixing cover 152 is an arc in the middle, and the structure of the second optical fiber fixing structure 154 is the same as that of the first optical fiber fixing structure 163, and there are two second optical fiber fixing structures 154.

The second fixing cover 152 is in the shape of an arc in the middle, so that a space is formed between the third arc-shaped groove 1511 and the second fixing cover 152 for accommodating the second rubber column 153. The optical fiber cable passes through the eighth through hole 1531. Tighten the screw to fix the second fixing cover 152 and the multi-fiber support column 151 and squeeze the second rubber column 153 to fix the optical fiber cable, and the remaining part of the single optical fiber cable 001 is fixed through the second optical fiber fixing structure 154. Two optical fiber fixing structures 154 are provided to ensure that all optical fiber cables can be fixed by the second optical fiber fixing structures 154, so that the optical fiber cables can be protected from vibration, impact, cable stretching, and twisting. The remaining part of the multi-fiber cable is put into the inner side of the door frame-shaped bracket 131 of the cable storage structure 13 to keep the inner cavity 11 neat.

On the basis of the above-mentioned embodiment, as a further preference, the bottom 111 of the inner cavity 11 is provided with a convex platform 1111, the convex platform 1111 is provided with a plurality of fifth threaded holes 1112, the box body 1 is provided with a bottom surface 101 exposed to the outside, the bottom surface 101 of the box body 1 is provided with a first concave platform 1011 and second concave platforms 1012, the second concave platforms 1012 are provided with two and are arranged on both sides of the first concave platform 1011, the depth of the convex platform 1111 is greater than the depth of the concave platform 1012, the bottom 111 of the first concave platform 1011 is provided with a plurality of protruding columns 1015 and hanging platforms 1013, the height of the protruding column 1015 is lower than the depth of the first concave platform 1011, the protruding column 1015 is provided with an eighth inner threaded hole 1014.

The cable storage structure 13 is arranged on the convex platform 1111, and screws pass through the fifth threaded hole 1112 and the first positioning hole 1321 to fix the cable storage structure 13 on the convex platform 1111, so as to facilitate the storage of optical fiber cables into the cable storage structure 13. The depth of the first concave platform 1011 is greater than the depth of the second concave platform 1012, and the bottom 111 of the first concave platform 1011 is provided with several protruding columns 1015, which not only ensures the strength of the box body 1, but also reduces the weight of the box body 1. By reducing the material of the box body 1, the cost is reduced. The hanging platform 1013 is used to hang the box body 1, and some of the protruding columns 1015 are provided with ninth threaded holes, and the ninth threaded holes pass through the bottom surface 101 of the box body 1 and communicate with the cavity. According to the application site conditions, the box body 1 can be fixed on the wall with screws through the ninth threaded hole. The height of the protruding column 1015 is lower than the depth of the first recess 1011 to ensure that the protruding column 1015 does not affect the suspension, screw fixing, etc. of the box body 1.

The above are only the preferred embodiments of the present application, and it should be pointed out that for those skilled in the art, some improvements and modifications can be made without departing from the principles of the present application. These improvements and modifications should also be regarded as the protection scope of the present application.

What is claimed is:

1. An optical fiber splicing box, comprising a box body and a box cover, the box body and the box cover are buckled, and the box body is provided with a first opening facing upward, the box body is provided with an inner cavity, wherein a first waterproof ring is provided between the box body and the box cover, the inner cavity comprises a bottom, and a side wall of the box body is provided with a first cable inlet/outlet that allows a single fiber cable with a connector to enter the inner cavity, a second cable inlet/outlet for a plurality of straight-through cables to enter the inner cavity, and a cable storage structure is fixed at the bottom of the inner cavity, and a top of cable storage structure is fixed with a plurality of stacked wiring structures, a first cable positioning structure and a second cable positioning structure are arranged in the box body, a plurality of first cable inlet/outlets are provided and are respectively arranged on both sides of the cable storage structure, and a plurality of the second cable inlet/outlets are provided and are respectively arranged on both sides of the cable storage structure, the first cable positioning structure is arranged between the first cable inlet/outlet and the wiring structure, and the second cable positioning structure is arranged between the second cable inlet/outlet and the wiring structure, a first waterproof structure is arranged between the first cable inlet/outlet and the optical fiber cable, and a second waterproof structure is arranged between the second cable inlet/outlet and the optical fiber cable;

wherein the box body comprises a left side wall, a right side wall, a front side wall and a rear side wall, wherein first upper openings of the left side wall and the right side wall are respectively provided with first flange structures extending toward the outside, the first flange structure is provided with a first half-through hole penetrating the left side wall or the right side wall, and the box cover is provided with a second flange structure extending toward the outside and corresponding to the first flange structure, the second flange structure is provided with a second half-through hole, and the first half-through hole and the second half-through hole are combined to form the first cable inlet/outlet.

2. The optical fiber splicing box according to claim 1, wherein the wiring structure comprises a fiber splicing tray and a thin cover that is clamped to the uppermost splicing tray, a fiber splicing cover hinged with the fiber splicing tray, the thin cover is located on the upper side of the fiber splicing tray, and the fiber splicing cover covers the upper side of the thin cover, and the fiber splicing tray is fixedly connected to the top of the cable storage structure and linearly stacked in sequence, and the adjacent fiber splicing trays are hinged.

3. The optical fiber splicing box according to claim 1, wherein the cable storage structure comprises a door frame-shaped bracket, a first fixed side plate and a second fixed side plate fixedly connected with the door frame-shaped bracket, the first fixed side plate and the second fixed side plate are fixed on the left and right sides of the door frame-shaped bracket, and form a "π" shape with the door frame-shaped bracket, the first fixed side plate and the second fixed side plate are both provided with first positioning holes, and the top of the door frame-shaped bracket is provided with second positioning holes.

4. The optical fiber splicing box according to claim 1, wherein the first waterproof structure comprises a cylindrical cylinder, side wing portions fixedly connected with an end of the cylindrical cylinder, the center of the cylindrical cylinder is provided with a third through hole, an outer surface of the cylindrical cylinder is provided with a first groove, and the hollow cylindrical cylinder is provided with a second opening communicating with the third through hole, and the side wing portions are provided with two and are symmetrically arranged on both sides of the second opening, and the side wing portion comprises a main body part, a side surface of the main body part is provided with a first cantilever structure fixedly connected to the side surface, and a side surface of the first cantilever structure is provided with a first triangular protrusion protruding from the upper and lower surfaces of the first cantilever structure, a positioning portion is provided at the end of the main body portion away from the cylindrical cylinder, the positioning portion is configured to be a straight-line rectangular parallelepiped, and the middle portion of the positioning portion is provided with an arc-shaped protrusion.

5. The optical fiber splicing box according to claim 4, wherein the first half-through hole and the second half-through hole are both provided with a positioning rib corresponding to the first groove, the left side wall, the right side wall, the front side wall, and the rear side wall are respectively provided with a first positioning groove, the sides of the left side wall, the right side wall, the front side wall, and the rear side wall facing the inner cavity are respectively provided with a first chamfer, wherein the first waterproof ring is provided with a first waterproof body, a second cantilever structure extending from the first waterproof body, a second triangular protrusion extending from the second cantilever structure, wherein the first waterproof ring is interrupted at the first cable inlet/outlet, and the first waterproof body is provided with a second positioning groove at the interruption, and the second positioning groove is provided with a third arc-shaped groove, and a lower half of the second triangular protrusion backs against the first chamfer.

6. The optical fiber splicing box according to claim 1, wherein the first cable positioning structure comprises a single optical fiber support column fixed to the bottom of the inner cavity, a first fixing cover screwed with the single optical fiber support column, a first optical fiber fixing structure fixed with the cable storage structure, a top of the single optical fiber support column is provided with a second arc-shaped groove, the first fixing cover is in the shape of an arc in the middle, the first optical fiber fixing structure comprises a first square fixing body, a first fixing plate extending from the first square fixing body to the side, the first square fixing body and the first fixing plate form an L-shape, the first fixing plate is provided with a ninth through hole, the first square fixing body is provided with a fourth through hole on the side facing the single fiber support column, a fourth threaded hole communicated with the fourth through hole is provided on the top of the first square fixing body, a first screw is provided in the fourth threaded hole.

7. The optical fiber splicing box according to claim 1, wherein the box body is provided with convex cylinders, the center of the convex cylinder is provided with a second cable inlet/outlet communicating with the inner cavity, a first external thread is provided on the outer side of the convex cylinder, the convex cylinders are arranged on both sides of the first cable inlet/outlet, the second waterproof structure comprises a claw partially defined in the second cable inlet/outlet, a second waterproof ring defined between the claw and the second cable inlet/outlet, a first rubber column defined in the claws, a tightening ring threadedly connected with the first external thread, the first rubber column is provided with a plurality of fifth through holes for the optical fiber cables to pass through.

8. The optical fiber splicing box according to claim 1, wherein the bottom of the inner cavity is provided with a convex platform, the convex platform is provided with a plurality of fifth threaded holes, the box body is provided with a bottom surface exposed to the outside, the bottom surface of the box body is provided with a first concave platform and second concave platforms, the second concave platforms are provided two second concave platforms and are arranged on both sides of the first concave platform, the depth of the convex platform is greater than the depth of the concave platform, the bottom of the first concave platform is provided with a plurality of protruding columns and hanging platforms, the height of the protruding column is lower than the depth of the first concave platform, the protruding column is provided with an eighth inner threaded hole.

* * * * *